Dec. 16, 1969 R. M. GENKE ET AL 3,484,763

WIRING CONFIGURATION FOR 2-WIRE COINCIDENT CURRENT MAGNETIC MEMORY

Filed Aug. 30, 1966 2 Sheets-Sheet 1

INVENTORS R. M. GENKE
P. A. HARDING
BY
Charles Scott Phelan
ATTORNEY

Dec. 16, 1969 R. M. GENKE ET AL 3,484,763

WIRING CONFIGURATION FOR 2-WIRE COINCIDENT CURRENT MAGNETIC MEMORY

Filed Aug. 30, 1966 2 Sheets-Sheet 2

United States Patent Office 3,484,763

Patented Dec. 16, 1969

3,484,763

WIRING CONFIGURATION FOR 2-WIRE COINCIDENT CURRENT MAGNETIC MEMORY

Richard M. Genke, Colts Neck, N.J., and Philip A. Harding, Aurora, Ill., assignors to Bell Telephone Laboratories, Incorporated, Murray Hill, N.J., a corporation of New York Filed Aug. 30, 1966, Ser. No. 576,042
Int. Cl. G11b *5/00*
U.S. Cl. 340—174 11 Claims

ABSTRACT OF THE DISCLOSURE

A memory wiring configuration includes orthogonally oriented first and second sets of circuits which are coupled to bistable magnetic devices located at circuit intersections. Circuits of the first set are arranged in parallel-connected pairs, and circuits of the second set are in series-connected combinations wherein each such combination has a dual device linkage with a first set circuit, but individual device linkages for any dual linkage of a combination are in opposite senses. When the configuration is used in a store, dual linkages are defined by address information; and one of the two magnetic devices at each such linkage is selected by appropriate polarity selection for a drive current.

Figure 2:
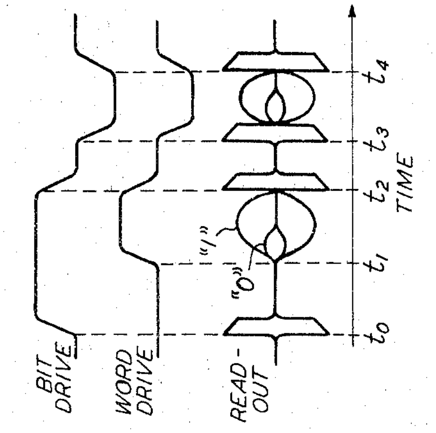

This invention relates to an organization for 2-wire coincident current magnetic memories.

It is known in the art to employ a so-called 2½-dimensional memory operating with coincident current read and write drive. Two-wire memory planes in such memories include orthogonal X and Y sets of drive circuits in which one set also serves the memory sensing function. In these memories a polarity selection of the drive signal on one drive circuit set is used for address selection. However, such memories are troubled by a large shuttle noise problem resulting from the manner in which it has been deemed necessary to construct embodiments of the prior art.

Shuttle noises are induced in memory sensing circuits in response to the application of coincident selection drive signals individually to different nonselected memory locations at substantially the same time that such signals are applied in coincidence to a selected memory location. Such shuttle noises accumulate in the memory sensing circuits from one memory location to another, and they often are of sufficient total size to mask a desired read-out signal and thereby prevent the correct detection of such signal. Consequently, the maximum useful size for magnetic memories is often limited, at least in part, to sizes which produce only tolerable shuttle noises in the memory sensing circuits. The size limitation may be raised to some extent, as is known in the art, by extending the memory operating cycle to include time for the application of coincident selection signals on a time staggered basis. Providing a time guard interval in this fashion permits the shuttle noises generated by one of the two sets of drive signals to be dissipated before a drive signal is applied to the other set of circuits in order to complete the desired memory location selection. However, the duration of the time guard interval required depends upon the maximum anticipated noise amplitude, and such noise is usually quite large in prior art 2-wire memories.

It is, therefore, one object of this invention to improve 2-wire magnetic memories.

It is another object to reduce shuttle noises generated in 2-wire memories.

A further object is to reduce the time guard interval provided for read-time coincident selection in 2-wire memories.

Still another object of the invention is to facilitate the manufacture of magnetic memories.

These and other objects of the invention are realized in one illustrative memory embodiment thereof wherein first and second sets of orthogonally arranged drive circuits are linked in a matrix array to a plurality of bistable magnetic storage devices. The circuits of a first one of the sets are connected in pairs to operate as a balanced circuit for transmitting read-out signals for external utilization and to transmit drive signals longitudinally between a source and ground. Each circuit of a second one of the two sets has a dual linkage through pairs of the storage devices to predetermined pairs of circuits in the aforementioned first set of circuits, but each such dual linkage involves only one circuit of a pair in the first set. The dual linkage of the two aforementioned storage devices to their common first and second set circuits is in the same sense for one device and in the opposite senses for the other of the two devices.

It is one feature of the invention that sensing circuits of the indicated memory are coupled to circuits of the aforementioned first set, respectively, in a conjugate manner with respect to a source of drive signals which is also coupled thereto. Thus, drive currents in the second set of circuits disturb storage device pairs coupled in common to a first set circuit in opposite senses with respect to the latter circuit so that a subsequent drive current in that circuit, and which is applied to the same pair of memory devices, produces a shuttle noise in only one device of the pair and thereby minimizes the effect of such noises upon the sensing circuits of the memory.

A further feature is that memory sensing circuits are conjugately coupled to circuits of the first set so that such shuttle noises as are produced in two first set circuits of a pair tend to offset one another.

It is another feature of the invention that memory storage devices which are linked to different circuits in a pair of the circuits of the mentioned first set are in different memory device planes so that the circuits of the second set are easily coupled to memory locations linking only one circuit of a first set pair.

A further feature is that coincident selection is employed on both read and write drives.

A further feature is that only a single storage device is required for each bit of information stored in the memory.

Figure 1:
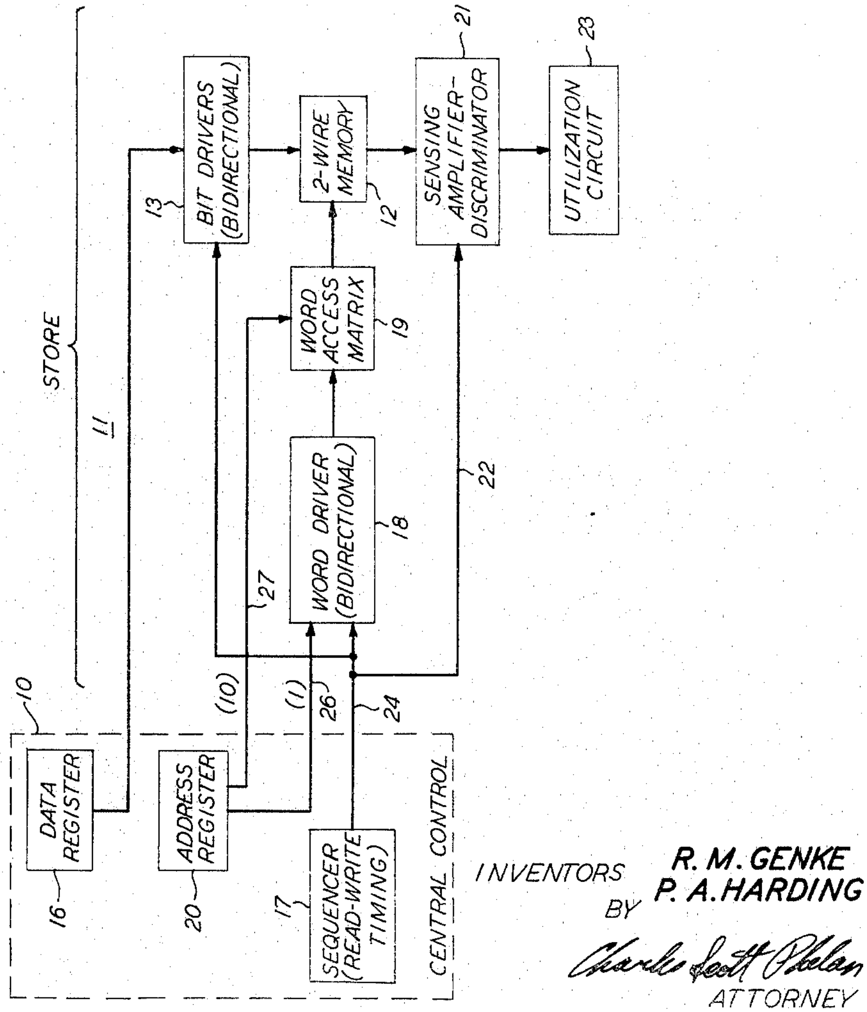
Figure 3:
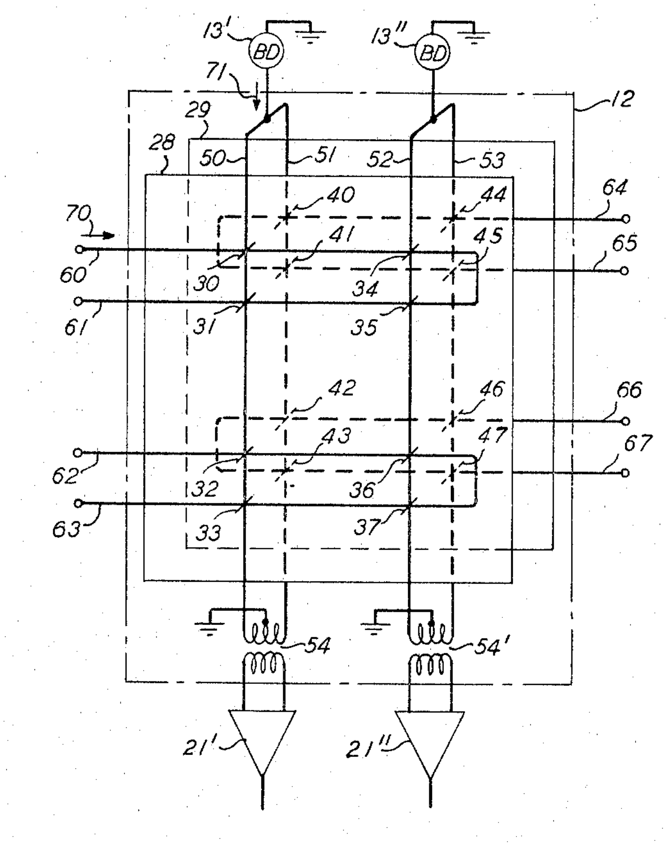
Figure 4:
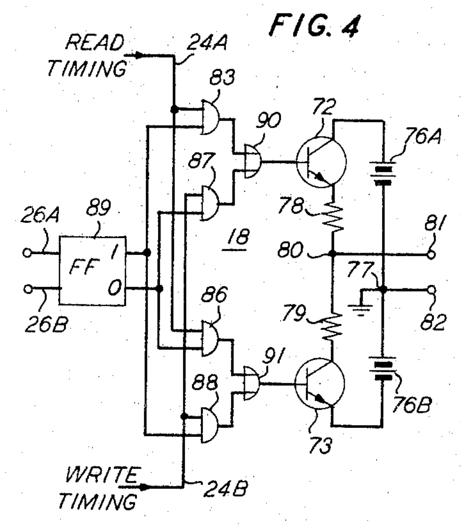
Figure 5:
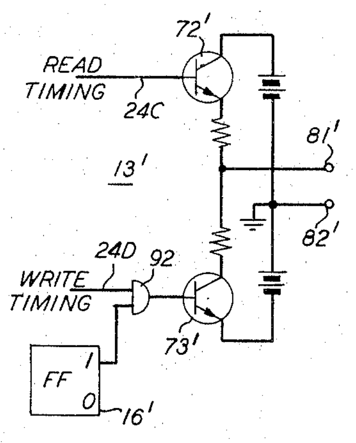

A more complete understanding of the present invention may be obtained from a consideration of the following detailed description taken in connection with the appended claims and the attached drawing in which:

FIG. 1 is a greatly simplified block and line diagram of a data processing system utilizing the present invention;

FIG. 2 includes a group of simplified wave diagrams illustrating the operation of the invention;

FIG. 3 is a schematic diagram of a portion of the circuit of FIG. 1 and iluustrates the operation of the invention; and FIGS. 4 and 5 are schematic diagrams of current drivers employed in the memory system of FIG. 1.

In FIG. 1 the data processing system illustrated there includes a central control unit 10 which provides certain processing functions and which includes circuits for cooperating with an associated store 11 in carrying out processing functions. Store 11 includes a 2-wire magnetic memory 12 which is hereinafter considered in the form of a magnetic memory employing an array of bistable magnetic devices such as toroidal magnetic cores of a type well known in the art. Such cores display a substantially rectangular hysteresis characteristic defining stable remanent flux density conditions of opposite polarity between which the core may be switched by the application of a magnetomotive force of appropriate polarity and minimum magnitude. A 2-wire memory is one in which only two wires are employed for all reading, writing, and sensing functions at an information bit storage location. Within the memory 12 a single core is provided for the storage of any single information bit.

Two orthogonally arranged sets of circuits, illustrated in detail in FIG. 3, are provided for supplying coincident selection currents to the memory 12 of FIG. 1 in accordance with binary coded address bits stored in a data register 16 of the central control unit 10. Bidirectional bit drivers 13 provide either positive-going or negative-going signals to one of the sets of circuits of the memory 12 for performing reading and writing functions at proper times as directed by timing signals from a sequencer 17 in the unit 10. Similarly, a bidirectional word driver 18 responds to timing signals from the sequencer 17 to provide drive current pulses through a word access matrix 19 to a second set of the orthogonal circuits, one of which is coupled to a selected word location in the memory 12.

Ten bits of memory address information are advantageously supplied on circuit 27 from a register 20 in one embodiment for controlling the operation of the matrix 19 to establish a current access path from the driver 18 to an indicated word address in the memory 12. The design and use of such matrices is well known for data processing systems. During a read-out operation the memory 12 supplies signals representing each bit of a word to sensing amplifier-discriminator circuits 21. The latter circuits are gated into operation during only a predetermined read-out portion of a memory cycle as directed by timing signals supplied on a circuit 22 from the sequencer 17. The output from circuit 21 is coupled in turn to any suitable utilization circuit 23 which advantageously includes connections (not shown) to the unit 10 for operating upon information derived from the memory 12 and further connections (not shown) to rewrite into the memory 12 information which has just been extracted therefrom.

The word driver 18 also receives a bit of address information from the register 20 by way of a circuit 26, and this address signal is utilized to control the polarity of the output from driver 18. Such polarity information is utilized in conjunction with the address information supplied on circuit 27 to the matrix 19 to select a particular location in the memory 12. This technique of employing a drive current polarity as a part of the address indication will be hereinafter briefly outlined.

FIG. 2 contains a family of wave diagrams illustrating the operation of the store 11 in a complete read-write cycle. These diagrams show general signal relationships and do not present exact signal configurations to scale. It is shown in FIG. 2 that the bit drive signal for producing read-out is applied from the drivers 13 at a time $t_0$ prior to the application of the word drive signal at a time $t_1$ from the driver 18. This early application of the bit drive permits the noise signals resulting from the bit drive leading edge transient to subside before the influence of the word drive signal is added thereto in the memory to accomplish magnetic core switching. In accordance with the present invention the time guard space thus provided is substantially smaller than is normally required in magnetic memories for reasons which will be subsequently described in connection with FIG. 3.

The read-out signal from a typical bit circuit of memory 12 is also shown in FIG. 2 in the form that it has at the input to the amplifier-discriminator circuits 21. The various forms are, of course, realized in different memory cycles but are superimposed on one another in the drawing. Thus, a large noise spike occurs in the read-out at the time $t_0$ of application of the bit drive signal; but this does not affect the circuits 21 since they are normally gated, by the signal on circuit 22, to a relatively insensitive condition at that time. This spike and other similar spikes in FIG. 2 result from the fact that individual memory storage devices have different information states and shuttle histories so that imperfect noise cancellation results as is known in the art. The spike at time $t_0$ is followed at time $t_1$ by signal read-out from the selected memory location and corresponding to either a binary ONE or a binary ZERO as may be appropriate for the selected bit in the memory 12. No noise spike appears at time $t_1$ because only the word drive signal is then changing, and the selected word drive circuit has a common linkage of only two cores with any one bit circuit as will be shown in FIG. 3. Bipolar ONE and ZERO signals are shown superimposed in FIG. 2 since the diagrams of that figure represent superimposed signals for a plurality of memory cycles during which either ONE or ZERO signals of either polarity may have been produced.

At time $t_2$ the word and bit read drives are terminated, and another noise spike appears. Read-out time in FIG. 2 is followed by a write-in time, from time $t_3$ to time $t_4$, during which bit and word drive signals of substantially the same configuration and duration are applied. Noise spikes are again produced at the bit drive transition times. Information-dependent read-out signals appear again at the input to the amplifier-discriminator circuits 21, this time representing information being written into the selected memory location. However, circuits 21 are enabled only at the interval $t_1$–$t_2$ and are insensitive at write-in time so the utilization circuit 23 is not affected.

The invention is more fully depicted in FIG. 3 of the drawing wherein two illustrative core planes 28 and 29 are shown. Each plane includes a plurality of cores which are oriented individually in planes that are perpendicular to the planes 28 and 29 and which are also at a diagonal with respect to both the horizontal and vertical directions in the drawing. Eight such cores, 30 through 37, are illustrated in the front plane 28. Similarly, eight cores, 40 through 47, are indicated in the rear plane 29 of the drawing. Many more cores are, of course, advantageously provided in each of the planes, but they are not shown since they are not required to indicate the principles of the present invention. In addition, a ground plane member (not shown is advantageously arranged between the core planes 28 and 29 to provide a convenient return current path for the digit current and thereby reduce both the chances for significant interference and the memory drive power required.

A first set of drive circuits includes four bit-drive circuits 50, 51, 52, and 53 for applying bit drive signals to the cores of the memory planes. Circuits 50 and 51 are coupled in parallel as a drive circuit pair for driving cores in planes 28 and 29, respectively. The circuits 50 and 51 receive bit drive signals in multiple from a driver 13′ which is part of the bit drivers 13 indicated in FIG. 1. Driver 13′ applies drive signals between ground and the circuits 50 and 51, and such signals are transmitted in parallel through these two circuits to the terminals of the primary winding of a transformer 54. The center tap of the primary winding on transformer 54 is returned to ground, and the secondary winding is coupled to an amplifier-discriminator 21′ which is a part of the amplifier-discriminator circuits 21 in FIG. 1. Thus the drive circuits 50 and 51 are employed for the longitudinal transmission of the bit drive currents from driver 13′ while the amplifier-discriminator circuit 21 uses the same pair of drive circuits as a balanced circuit for supplying read-out signals. The sensing and bit drive functions thus employ the bit circuits 50 and 51 as a balance network wherein the driver and sense amplifier branches are substantially conjugate. That is, the network branches including driver 13′ and amplifier-discriminator 21′ can operate at the same time. However, a voltage change in the bit driver branch produces no substantial current change in the sensing branch.

Bit drive circuits 52 and 53 are coupled to their bit driver 13″ and their amplifier-discriminator 21″ through a transformer 54′ in essentially the same manner previously described for the circuits 50 and 51. All other bit circuits (not shown) are also similarly arranged with each individual bit circuit of a pair linking cores which are all in a single core plane just as bit circuit 53 links only cores in plane 29.

A plurality of word drive circuits 60 through 67 are provided in FIG. 3, and these circuits also are paired, but they are paired in a series connection so that each series-connected pair, e.g., word drive circuits 60 and 61, couples word drive signals to two rows of cores all lying in a single memory plane. It will be seen then that each word drive circuit pair has a dual linkage with each individual bit drive circuit that also links cores in the same plane. Thus, the word drive circuit 60–61 has a dual linkage with the bit drive circuit 50 at the cores 30 and 31. However, no word drive circuit pair links more than one bit drive circuit of a bit drive circuit pair.

Each of the cores of the dual linkage of cores 30 and 31 is coupled to its bit drive circuit 50 in the same sense with respect to such circuit and to its word drive circuit pair 60–61 in the same sense with respect to such word drive circuit pair. However, because of the fact that the word drive circuit pair 60–61 is in the form of a folded word drive circuit, the linkage thereof to individual cores 30 and 31 of the dual linkage with bit drive circuit 50 is in opposite sense with respect to the bit circuit linkage. Stated differently, the coupling of any bit circuit and word circuit pair to their dual linkage cores is in the same sense in one core and in opposite sense in the other.

It is known in the art that the application to a bistable magnetic device of successive shuttling magnetomotive forces of less than the magnitude required for switching, and of alternating polarities, produce partial irreversible flux switches that induce noise voltages in a sensing circuit linked to the device. However, successive shuttling forces of the same polarity result in substantial noise from only the first such force. Thus, any polarity of word drive current which is applied to a word drive circuit pair disturbs the cores of a dual linkage with a bit drive circuit so that a subsequent disturbance of the same dual linkage by a bit circuit current induces a significant disturbance signal from only one core of the dual linkage in such bit circuit as a result of the previous word drive circuit disturbance. Consequently, the maximum possible disturbance signal from such dual linkage is the total of that from only half of the dual linkage cores along a bit drive circuit.

The same principles hereinbefore outlined in connection with the relationships of the word drive circuit 60–61 and its dual linkage at cores 30 and 31 to bit drive circuit 50 govern similar arrangements for linkages to other bit circuits and corresponding linkages for each of the other word drive circuit pairs 62–63, 64–65, and 66–67. The latter two pairs of word drive circuits have their terminals brought out at the right-hand side of the plane 29 rather than at the left-hand side as shown for the former two pairs on the plane 28 as a matter of manufacturing convenience only.

In order to illustrate the operation of the present invention assume, for example, that a word location along the wire 60, and including the cores 30 and 34, is to be selected for read-out. Then examine the noise which is produced in the bit circuits 50 and 51 during such a read-out operation. Regardless of the previous history of application of half-select currents to any folded word drive circuit, such current always tends to disturb the cores of its dual linkage with any single bit drive circuit in opposite directions with respect to such bit circuit with the result that any digit half-select current thereafter applied to such dual linkage can further disturb only one core of the dual linkage. Thus, the application of a word drive half-select current with the polarity indicated by the arrow 70 in FIG. 3, and a bit drive half-select current with the polarity indicated by the arrow 71 in FIG. 3, applies full-select magnetomotive force to the core 30 of the selected word. Similar currents in other bit circuits that are coupled to cores linked by circuit 60 also receive full read direction magnetomotive force.

The word drive half-select current in circuit 61 may under worst conditions of the example shuttle core 31 to produce a half-select noise in the bit drive circuit 50. Such noise is typically of such small magnitude that it alone could not mask out a binary ONE signal read-out from core 30. Furthermore, it is known in the art that such a single shuttle noise could not accumulate with a binary ZERO read-out from core 30 to produce in digit circuit 50 a noise of sufficient magnitude to be mistaken for a binary ONE read-out. The only half-select current which affects cores 32 and 33 during this read-out is the bit drive current from source 13′, and in accordance with the present invention that read half-select current can disturb only one of the two cores 32 and 33, which had previously been disturbed by a half-select word current on the word drive folded circuit 62–63.

Assume further for the present example that the previous history of the cores 32 and 33 had included as the last disturbance therein, prior to the read-out of the present example, a half-select bit drive current in the circuit 50 which was provided for a memory operation at some word location other than one including the cores 32 and 33. Some disturbance previous history of unpredictable polarity would also characterized the cores 42 and 43 in the back plane 29 which are linked by the digit drive circuit 51 that is paired with circuit 50. If the last previous history of cores 42 and 43 had been the same as for cores 32 and 33 the digit drive disturbances in the circuits 50 and 51 were necessarily produced by digit drive currents of the same polarity, and the subsequent noises produced by the bit drive of the present example tend to offset one another insofar as their effects upon transformer 54 and the sensing amplifier-discriminator 21′ are concerned. If cores 42 and 43 had a different previous history from cores 32 and 33, a maximum worst case sensing circuit noise from the four cores would be the noise difference of two cores.

The previously described example of the operation of the present invention may be contrasted, for example, with a memory (not shown ) wherein the bit drive circuits of a pair both lie in the same core plane; and each single unfolded word drive circuit is linked to both bit drive circuits of the pair for reasons of manufacturing convenience. In this situation it is possible to have a serious worst case noise problem. Such a problem would be generated by a bit drive current which would disturb all cores coupled to both circuits of a bit drive circuit pair to a walked-up remanent flux density condition for their particular information state. Further in connection with the worst case condition, it is assumed that all of the single unfolded word drive lines are pulsed with half-select pulses of the same polarity in any word line sequence. The pulsing of each such word line necessarily causes the cores of its dual linkage with the two circuits of a bit drive circuit pair to be disturbed in different directions. Thus, one dual linkage core is walked down and the other stays in its walked-up condition produced by the previous bit drive disturbance. This results from the fact that the word line must link the cores of its dual linkage in opposite senses in order to permit the use of word line signal polarity for core address selection as hereinbefore discussed.

Now a further bit drive pulse is applied to the bit circuit pair under consideration, in the contrasted worst case example, and links the cores of all dual linkages with word drive circuits. Regardless of the bit drive current polarity, it must disturb all of the cores coupled to one individual bit circuit or the other of the pair being driven so that some irreversible flux switching takes place at each of such disturbed cores and induces a corresponding noise in the bit drive circuit to which it is linked. These noises accumulate and tend to mask the read-out from the desired core because the cores linked to the other circuit of the bit drive circuit pair are not significantly disturbed by the bit drive current since they have been previously disturbed by word drive currents and produce no significant irreversible flux switching noise that can be used in the transformer 54 for noise cancellation purposes. In order to offset this type of noise for memories in which both sides of a bit drive circuit pair are in the same core plane, either the number of word storage locations in the plane must be severely limited or the time guard space between the application of bit drive current and word drive current must be made quite large in order that such noise may be dissipated before word drive current is applied to accomplish final irreversible flux switching at the selected word location.

As hereinbefore described, the illustrated embodiment of the present invention, with the two circuits of a bit drive circuit pair in different planes and with a folded word drive circuit which link cores in only one plane, has a possibility for worst case noise, on an individual bit drive circuit, in which only half of the cores linked to any given bit drive circuit may possibly produce noise in the sensing circuits for the corresponding bit position. Furthermore, such noises tend to cancel similar noises from the other bit circuit of the same pair in transformer 54. In the contrasted memory form (not shown), with the circuits of a bit drive pair in the same plane, all of the cores linked to a given individual bit drive circuit of a pair may in the worst case produce noise that affects the bit position sensing circuits; and there is no significant offsetting noise from the other individual bit circuit of the pair.

It is well known in the art that bistable magnetic devices respond to applied magnetomotive forces by producing either reversible or irreversible flux changes, or both, depending upon the magnitude and polarity of an applied magnetomotive force with respect to the characteristics of the magnetic material and the orientation of flux in the material prior to the application of such force. The reversible flux switching corresponds to ordinary transformer action and is present during the operation of bistable magnetic cores in a memory of the type considered in the present application. However, in accordance with an aspect of the present invention, noise voltages produced in a bit drive circuit as a result of reversible flux switching in response to a word drive half-select current, tend to cancel one another. The cancellation results from the fact that such noise voltages are of opposite polarity at the two cores of a dual linkage between any folded word drive circuit and any single bit drive circuit in accordance with the illustrated embodiment of the invention.

It can be seen in FIG. 3 that all of the cores are geometrically oriented in the same direction, i.e., along diagonals from the lower left to the upper right of any word and bit circuit intersection. This common core orientation is made possible by the previously described word and bit drive circuit arrangements, and it facilitates manufacture of core planes for use in memories in accordance with the invention. Thus, for example, individual word drive circuits are advantageously laced in a straightaway manner through rows and columns, respectively, of the cores. Such circuits are then conveniently interconnected in the manner described to form a 2-wire magnetic memory of the invention. The word drive circuits are interconnected into folded single-plane word circuits, and the bit drive circuits are interconnected as dual two-plane bit circuits. It is not necessary to take special manufacturing precautions to have cores in different columns oriented differently, and no unusual wiring manipulations are required to have any given circuit link particular cores of a particular row or column in different directions FIG. 4 illustrates a circuit diagram of a bidirectional word driver that is advantageously employed for driver 18 in the present invention. This bidirectional driver includes two transistors 72 and 73 which have their collector-emitter circuits connected in a closed loop across the terminals of a battery that includes the two sections 76A and 76B with an intermediate terminal 77 between such sections connected to ground. Each of the transistors 72 and 73 represents a separate current switch and is operative in the circuit as will be subsequently described. However, other switch configurations may also be advantageously employed.

Two resistors 78 and 79 are connected in series in the loop circuit between the emitter electrode of transistor 72 and the collector electrode of transistor 73. A loop circuit terminal 80, between those two resistors, and the terminal 77 are connected to output terminals 81 and 82. respectively, which are applied to the word access matrix 19 of FIG. 1 in a manner which is well known in the art. Conduction in the two transistors is controlled by the output signals from sequencer 17 and address register 20 in FIG. 1 so that only one of the two transistors conducts at a time thereby providing bidirectional output signals at terminals 81 and 82 since the transistors 72 and 73 are of the same conductivity type and are polled for collector-emitter current flow in the same direction around the aforementioned loop circuit.

Read and write timing signals are applied on circuits 24A and 24B, respectively, in FIG. 4 from the sequencer 17 in FIG. 1. These two circuits correspond to the circuit 24 in FIG. 1. The read timing signals are coupled to enable two conventional coincidence gates 83 and 86 while the write timing signals are coupled to enable two conventional coincidence gates 87 and 88. Thus, during either a read-out interval or a write-in interval one coincidence gate in the base electrode input to each of the transistors 72 and 73 is enabled. One bit of address information from register 20 in FIG. 1 is applied in double rail logic form on circuits 26A and 26B, corresponding to circuit 26 in FIG. 1, to a bistable circuit 89. The latter circuit is of any well known form for producing complementary binary ONE and ZERO output signals. The state of the bistable circuit 89 is thus under the control of the address information and provides output signals of correct form to cause conduction in one or the other of the transistors 72 or 73 to energize a selected core of a dual linkage with the correct polarity for the indicated read or write operation.

The binary ONE output of circuit 89 is applied to read gate 83 and the write gate 88, and if either one of those two gates is enabled at the time of application of such binary ONE signal it produces an output which is coupled through a corresponding one of two conventional OR gates 90 and 91 to the base electrode of the corresponding one of the transistors 72 or 73. Similarly, the binary ZERO output from the bistable circuit 89 is coupled to the write gate 87 and the read gate 86 for causing the enabled one of those two gates to provide an output through a corresponding one of the OR gates 90 or 91 to actuate the corresponding one of the transistors 72 or 73.

If transistor 72 is enabled for conduction, an output half-select drive signal is produced at terminals 81 and 82 with the terminal 81 being positive with respect to ground. Transistor 73 is necessarily disabled at the same time since the one of its input coincidence gates, which is then enabled by the same timing signal from sequencer 17, does not receive an actuating signal from the bistable circuit 89. Similarly, when transistor 73 is enabled for conduction, transistor 72 is disabled; and the output signal at terminals 81 and 82 is produced as a result of conduction in transistor 73 to cause terminal 81 to be negative with respect to ground.

A single driver of the type illustrated in FIG. 4 is advantageously employed for the driver 18 in FIG. 1. The output of such driver is advantageously connected through word access matrix 19 to a word drive circuit in memory 12 as indicated by the output from address register 20 on circuit 27, all as is well known in the art.

In FIG. 5 is a circuit diagram of a bidirectional bit driver of the type employed for each of the drivers 13′ and 13″. This driver is similar to the driver of FIG. 4 in that it includes two transistors 72′ and 73′ connected in a loop circuit for producing bidirectional signals at output terminals 81′ and 82′. The transistors are also driven so that only one or the other of them conducts at any one time, but the logic controlling such transistor conduction is different from that indicated in FIG. 4. Thus, read and write timing signals from sequencer 17 in FIG. 1 are applied on circuits 24C and 24D, respectively, to the digit driver of FIG. 5. Circuits 24C and 24D correspond to the circuit 24 of FIG. 1. The read timing signal is applied to the base electrode of transistor 72′ during every read interval to produce a bit drive half-select signal of appropriate polarity to read out a selected core on a selected bit circuit. During the write interval a write timing signal on circuit 24D enables a coincidence gate 92 in the base electrode circuit of transistor 73′. If at that time a bistable circuit 16′, which comprises one stage of the data register 16 in FIG. 1, has been actuated to produce a binary ONE output signal to the gate 92, transistor 73′ is driven into conduction to produce a digit drive half-select output signal at terminals 81′ and 82′ to cooperate with a word drive signal for writing a binary ONE at a selected digit location in memory 12. If the bistable circuit 16′ does not rest in its binary ONE condition during the write interval, gate 92 lacks sufficient input signals to initiate conduction in transistor 73; and no bit output drive signal is produced for the bit position controlled by the particular driver of FIG. 5. Each bit position has a separate driver of the type shown in FIG. 5, and its gate 92 is coupled to a different bistable circuit stage of the data register 16 in FIG. 1.

Although the present invention has been described in connection with a particular embodiment thereof, it is to be understood that additional embodiments and modifications which will be obvious to those skilled in the art are included within the spirit and scope of the invention.

What is claimed is:

1. In a magnetic memory, a plurality of bistable magnetic devices having rectangular hysteresis characteristics defining two states of stable magnetic flux remanence between which such devices may be switched by the application of appropriate magnetomotive force, two sets of orthogonally oriented drive circuit coupled to said devices, a first one of said sets including a plurality of individual circuits coupled in parallel-connected pairs, a second one of said two sets of drive circuits including a plurality of individual circuits each of which links only one of said devices which is also coupled to any given one of said pairs of drive circuits, a first one of said circuits of said second set being coupled with at least a second one of the circuits of the same set in a separate series connection for each such second circuit, said one device of each of said first and second circuits being also linked to a common one of said first set drive circuits, and the coupling of said first and second circuits to their respective ones of said devices, and the coupling of said common first set circuit to said respective ones of said devices, being in a first coupling sense relationship in the one of such respective devices coupled to said first circuit and in a second coupling sense relationship in all others of such respective devices.

2. The magnetic memory in accordance with claim 1 in which said individual circuits of said second set are coupled in series-connected pairs so that each such series-connected pair links two of said devices which are also coupled to the same drive circuit of said first set pairs to form a dual linkage with the last mentioned circuit.

3. The memory in accordance with claim 2 in which means coincidentally drive one circuit pair of each of said sets for applying said magnetomotive force to a predetermined one of said one devices.

4. The memory in accordance with claim 3 in which sensing means are coupled to each of said pairs of circuits of said first set, such coupling being conjugate with respect to said drive means for such first set circuit pairs.

5. The magnetic memory in accordance with claim 2 in which said devices are arranged in two separate device planes, the two individual circuits in each circuit pair of said first set are coupled to devices in different ones of said planes, and each circuit pair of said second set is coupled to only devices in a single one of said planes.

6. The magnetic memory in accordance with claim 1 in which said devices are toroidal cores geometrically oriented in the same sense with respect to the orientation of said first and second sets of drive circuits.

7. The magnetic memory in accordance with claim 4 in which said sensing means comprises means sensing a voltage difference between both individual circuits in a pair of circuits of said first set.

8. The magnetic memory in accordance with claim 5 in which sensing means are coupled to said pairs of said first set for sensing a voltage difference between both individual circuits in a pair of circuits of said first set.

9. The magnetic memory in accordance with claim 1 in which each of said devices comprises a different information bit storage location.

10. The magnetic memory in accordance with claim 1 in which each circuit pair of said second set is folded back upon itself to form with said devices two rows of storage locations in said memory, and said one devices linking each circuit pair of said second set to a circuit of said first set are arranged on opposite sides of said second set circuit pair in its folded form.

11. The memory in accordance with claim 3 in which said driving means includes a source of address signals defining in said memory a location corresponding to a plurality of said devices, each such device being coupled to a different circuit of said second set, and means responsive to said address signals controlling the polarity of drive applied to a circuit pair of said second set for switching only one of said devices in said dual linkage at said location between its stable states.

References Cited

UNITED STATES PATENTS

| | | | |
|---|---|---|---|
| 3,209,337 | 9/1965 | Crawford | 340—174 |
| 3,303,481 | 2/1967 | Kessler | 340—174 |
| 3,305,846 | 2/1967 | Amemiya | 340—174 |

OTHER REFERENCES

Benima et al., RCA Tech. Notes, TN 669, June 1966.

Atwood, IBM Tech. Disclosure Bulletin, vol. 3, No. 10, March 1961, pp. 105, 106.

BERNARD KONICK, Primary Examiner

BARRY L. HALEY, Assistant Examiner

Disclaimer 3,484,763.—*Richard M. Genke*, Colts Neck, N.J., and *Philip A. Harding*, Aurora, Ill. WIRING CONFIGURATION FOR 2-WIRE COINCIDENT CURRENT MAGNETIC MEMORY. Patent dated Dec. 16, 1969. Disclaimer filed Feb. 2, 1970, by the assignee, *Bell Telephone Laboratories, Incorporated.*

Hereby enters this disclaimer to claims 1 through 4, 7, and 10 of said patent.

[*Official Gazette June 2, 1970.*]